(12) United States Patent
Macias et al.

(10) Patent No.: US 11,554,693 B2
(45) Date of Patent: Jan. 17, 2023

(54) VEHICLE SEAT

(71) Applicant: Faurecia Sièges d'Automobile, Nanterre (FR)

(72) Inventors: Jan Macias, Brières-les-Scellés (FR); Philippe Demptos, Malesherbes (FR); Frederic Pinto, Brières-les-Scellés (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 17/390,966

(22) Filed: Jul. 31, 2021

(65) Prior Publication Data
US 2022/0032824 A1 Feb. 3, 2022

(30) Foreign Application Priority Data

Jul. 31, 2020 (FR) ...................................... 2008143

(51) Int. Cl.
*B60N 2/22* (2006.01)
*B60N 2/30* (2006.01)

(52) U.S. Cl.
CPC .............. *B60N 2/22* (2013.01); *B60N 2/3011* (2013.01); *B60N 2/3013* (2013.01); *B60N 2205/35* (2013.01)

(58) Field of Classification Search
CPC .... B60N 2/22; B60N 2205/35; B60N 2/3011; B60N 2/3013
See application file for complete search history.

(56) References Cited

U.S. PATENT DOCUMENTS

| | | | |
|---|---|---|---|
| 6,701,572 B2* | 3/2004 | Bechthold | E05D 11/087 16/241 |
| 7,073,861 B2* | 7/2006 | Ichikawa | B60N 2/015 297/378.12 |
| 9,452,690 B2* | 9/2016 | Kämper | B60N 2/22 |
| 9,688,169 B2* | 6/2017 | Contorbia | B60N 2/4235 |

(Continued)

FOREIGN PATENT DOCUMENTS

| | | | | |
|---|---|---|---|---|
| DE | 29923174 U1 * | 5/2000 | | B60N 2/015 |
| EP | 3643563 A1 * | 4/2020 | | B60N 2/682 |

(Continued)

OTHER PUBLICATIONS

French Search Report corresponding to FR Application No. FR 2008143, dated May 23, 2021, 2 pages.

(Continued)

*Primary Examiner* — Timothy J Brindley
(74) *Attorney, Agent, or Firm* — Reising Ethington P.C.

(57) ABSTRACT

A vehicle seat for accommodating at least two users includes: a seating portion frame, a first backrest and a second backrest which are pivotally hinged to the seating portion frame according to a transverse axis via a common hinge. The common hinges includes: a pivot pin comprising at least one central portion having an outer wall, and a housing, having an inner wall, arranged on the seating portion frame, and receiving interiorly the central portion of the pivot pin, by immobilizing the pivot pin. The inner peripheral wall of the housing bears against the outer wall of the central portion. The outer wall of the central portion includes at least one elastically deformable rib so as to be maintained constantly bearing against the inner wall of the housing.

17 Claims, 4 Drawing Sheets

(56) References Cited

U.S. PATENT DOCUMENTS

| 10,596,933 B2 * | 3/2020 | Vogt ........................ B60N 2/015 |
| 2011/0187168 A1 | 8/2011 | Zorine |
| 2014/0084657 A1 * | 3/2014 | Edwards ................ B60N 2/366 |
| | | 297/354.1 |
| 2021/0095735 A1 * | 4/2021 | Pistilli ................... F16F 1/3732 |
| 2022/0032826 A1 * | 2/2022 | Klitting ................. B60N 2/015 |

FOREIGN PATENT DOCUMENTS

| EP | 3944985 A1 * | 2/2022 | ........... B60N 2/2222 |
| FR | 3027566 A1 * | 4/2016 | ............. B60N 2/015 |
| FR | 3027566 A1 | 4/2016 | |
| FR | 3116773 A3 * | 6/2022 | |
| KR | 101518642 B1 * | 2/2015 | |
| WO | 2010009321 A1 | 1/2010 | |

OTHER PUBLICATIONS

Written Opinion corresponding to FR Application No. FR 2008143, dated May 23, 2021, 5 pages.

\* cited by examiner

VEHICLE SEAT

TECHNICAL FIELD

The invention relates to a vehicle seat, configured to accommodate at least two users, and in particular of an automobile vehicle, as well as a vehicle bench equipped with such a seat, a vehicle equipped with such a bench, and a method for manufacturing such a seat.

The invention relates to the field of vehicle seats configured so as to accommodate at least two users, belonging in particular to a vehicle bench, which also generally comprises one or more seats, and is provided to accommodate several users, sitting side by side.

BACKGROUND

In a well-known manner, a vehicle generally comprises at least one seat intended for accommodating a driver or a passenger of the vehicle, hereinafter designated by the term "user". The seat can be intended for accommodating a single person or several persons sitting side by side, and can be disposed at the front or at the rear of the vehicle. The seat can also be part of a bench that can accommodate several persons side by side.

Thus, in terms of the invention, the term "seat" according to the invention designates a front seat of the vehicle as well as a rear seat of the vehicle. In the same way, the term "bench" according to the invention designates a front bench of the vehicle as well as a rear vehicle bench. Likewise, the invention can be implemented for bench seats intended for any type of vehicle and in particular automobile vehicles.

A vehicle seat generally comprises a seating portion frame, configured to be connected to the floor of a vehicle.

Generally, a bench is provided to accommodate at least two passengers, even three, positioned side by side and can be comprised of a single or of a plurality of seats positioned side by side.

A bench seat, which is provided to accommodate at least two passengers side by side, also comprises at least one first backrest, pivotally hinged according to the transverse axis of the seat to the seating portion frame, as well as one second backrest, also pivotally hinged to the seating portion frame according to said transverse axis.

The hinge between the first backrest, respectively the second backrest, and the seating portion frame, about said transverse axis is generally formed by a pivot pin, engaged with the seating portion frame, received in a corresponding housing arranged in the first backrest, respectively the second backrest, said pivot pin and said corresponding housing being configured so as to authorize the rotation of the housing about the pivot pin, and therefore of the first backrest, respectively of the second backrest, relative to the seating portion frame, about said transverse axis.

Also in a known manner, a common hinge at the seating portion frame can be provided for the first backrest and the second backrest, at an intermediate zone, in the transversal direction of the seat, of the seating portion frame, comprising a common pivot pin received simultaneously in a corresponding housing, arranged in each one of the first and of the second backrest, and so as to allow for the simultaneous hinging of the first backrest and of the second backrest relative to the seating portion frame.

Such a common pivot pin is fastened to the seating portion frame, so as to remain immobile relative to the latter. In order to facilitate the mounting thereof and the fastening thereof on said seating portion frame, it is generally mounted by force in a corresponding housing arranged on the seating portion frame, the pivot pin and said corresponding housing being configured to provide the immobilization of the pivot pin by friction between the outer peripheral wall of the pivot pin and the inner peripheral wall of said housing.

In the seats of the prior art, the outer peripheral wall of said pivot pin is of substantially cylindrical, or conical shape, as well as the inner peripheral wall of said housing.

Such a design of the pivot pin and of the housing, impose a high precision of the shape and of the dimensions of the outer peripheral wall of the pivot pin and of the inner peripheral wall of the housing, so as to provide an optimum maintaining of the first and of the second backrest on the seating portion frame.

However, and according to the observances of the inventor, such a precision of these dimensions is particularly complex to obtain, and, although the latter can be obtained and guaranteed at the time of manufacturing of the seat, the stresses undergone by the pivot pin and by the housing during the use of the seat can cause a modification in the shape and/or dimensions of the outer peripheral wall of the pivot pin and/or of the inner peripheral wall of the housing, thus creating clearance between the outer peripheral wall of the pivot pin and/or of the inner peripheral wall of the housing, so that the pivot pin is no longer fully immobile relative to the housing, and can be moved relative to the latter. During the use of the seat, and in particular during the movement of the vehicle to which it is fastened, these movements of the pivot pin relative to the housing will generate noise, due to the repeated contacts between the outer peripheral wall of the pivot pin and the inner peripheral wall of the housing.

In addition, these repeated contacts between the outer peripheral wall of the pivot pin and the inner peripheral wall of the housing risk causing a deterioration of the pivot pin and/or of the housing, which can even bring about a disengagement of the first backrest and/or of the second backrest relative to the seating portion frame.

SUMMARY

The invention overcomes these disadvantages or vehicle seats, configured so as to receive at least two users, and advantageously belonging to a vehicle bench, of the prior art, by proposing a vehicle seat configured to accommodate at least two users, the improved fastening between the first backrest and the seating portion frame, as well as between the second backrest and the seating portion frame, and not generating any noise during the use of said vehicle seat.

Another purpose of the present invention is to propose such a vehicle seat that improves the resistance of the fastening between the first backrest and the seating portion frame, as well as between the second backrest and the seating portion frame.

Another purpose of the present invention is to propose such a vehicle seat that is easy and rapid to manufacture.

Another purpose of the present invention is to propose such a vehicle seat of simple design and of reduced cost price.

A vehicle seat configured to accommodate at least two users is proposed, comprising:
- a seating portion frame, intended for being connected to the floor of a vehicle,
- a first backrest pivotally hinged to the seating portion frame according to the transverse axis of the seat,
- a second backrest pivotally hinged to the seating portion frame according to the transverse axis of the seat, wherein the first backrest and the second backrest are connected to the seating portion frame via a common hinge, positioned in an intermediate zone of the seating portion frame, in the transversal direction of the seat, wherein said common hinge includes:

a pivot pin of an axis coincident with the transverse axis of the seat, comprising at least one central portion having an outer peripheral wall, and two lateral portions: a first lateral portion and a second lateral portion, the two lateral portions being positioned on either side of the central portion according to the axis of the pivot pin, a first housing arranged on the first backrest and receiving interiorly the first lateral portion of the pivot pin, by authorizing the rotation of the first backrest relative to the pivot pin about the axis of said pivot pin, a second housing arranged on the second backrest and receiving interiorly the second lateral portion of the pivot pin, by authorizing the rotation of the second backrest relative to the pivot pin about the axis of said pivot pin, a third housing, having an inner peripheral wall, arranged on the seating portion frame, and receiving interiorly the central portion of the pivot pin, by immobilizing the pivot pin relative to the seating portion frame, the inner peripheral wall of the third housing bearing, at least partially, against the outer peripheral wall of the central portion of the pivot pin According to the invention, the outer peripheral wall of the central portion of the pivot pin includes at least one rib configured to be elastically deformed according to a substantially radial direction of the pivot pin, so as to be constantly maintained bearing against the inner peripheral wall of the third housing According to optional characteristics of the invention, taken individually or in combination:

the inner peripheral wall of the third housing has at least one groove, protruding in a radial direction from the inner peripheral wall opposite the axis of the inner peripheral wall, and received as support the rib of the outer peripheral wall of the central portion of the pivot pin;

the rib extends in an axial direction of the pivot pin;

the rib has a bearing face bearing against the inner peripheral wall of the third housing, and the rib is configured so that, at rest, when the central portion of the pivot pin is not received in the third housing, the distance separating the bearing face of the rib from the axis of the pivot pin is strictly greater than the radius of the third housing;

the rib is arranged in a single piece and from the same material with the central portion of the pivot pin;

the central portion includes a core made of metal material, and the outer peripheral wall of the central portion of the pivot pin is made of plastic material, and covers the core made of metal material;

the outer peripheral wall of the central portion of the pivot pin is carried out by overmoulding on the core made of metal material;

the rib is formed by a portion of the outer peripheral wall of the central portion of the pivot pin delimited by two grooves, substantially identical symmetrical with one another, arranged in the outer peripheral wall the grooves passing on both sides the material of the outer peripheral wall, in a radial direction of the pivot pin;

the grooves extend in a substantially axial direction of the pivot pin;

the outer peripheral wall has two axial ends: a first axial end in the vicinity of the first lateral portion and a second axial end in the vicinity of the second lateral portion, and wherein the grooves are provided as emerging on the second axial end of the outer peripheral wall;

the rib is formed by a portion of the outer peripheral wall of the central portion of the pivot pin delimited by a first groove arranged in the outer peripheral wall, extending in a substantially axial direction of the outer peripheral wall and by at least one second groove, arranged in the outer peripheral wall, and emerging at one of its longitudinal ends in the first groove, the first and the second groove passing both sides of the material of the outer peripheral wall, in a radial direction of the outer peripheral wall;

the outer peripheral wall has a means of stopping in translation of the pivot pin relative to the third housing in the axial direction of the pivot pin, arranged as a single piece and from the same material with said outer peripheral wall;

the outer peripheral wall has two axial ends: a first axial end in the vicinity of the first lateral portion and a second axial end in the vicinity of the second lateral portion, and wherein the means of stopping in translation is arranged on the outer peripheral wall at said second axial end of the outer peripheral wall, in the form of an annular protrusion protruding in a radial direction from the outer peripheral wall opposite the axis of the pivot pin and having a radius strictly greater than the radius of the third housing;

the first housing, the second housing and the third housing are coaxial, according to the transverse axis of the seat, and the first lateral portion, the second lateral portion and the central portion of the pivot pin are coaxial, according to the transverse axis of the seat.

According to another aspect, a vehicle bench is proposed comprising at least one seat according to the invention.

A vehicle is also proposed comprising a bench according to the invention.

A method is finally proposed for manufacturing a seat according to the invention, comprising the steps:

insertion of the central portion of the pivot pin in the third housing (54) arranged on the seating portion frame, so that the at least one rib of the central portion bears against the inner peripheral wall of the third housing;

insertion of the first lateral portion into the first housing of the first backrest, insertion of the second lateral portion into the second housing of the second backrest.

The characteristics mentioned in the following paragraphs can, optionally, be implemented. They can be implemented independently from one another or in combination with one another.

BRIEF DESCRIPTION OF THE DRAWINGS

Other characteristics, details and advantages of the invention shall appear when reading the detailed description hereinafter, and when analyzing the accompanying drawings, wherein.

DESCRIPTION OF EMBODIMENTS

The drawings and the description hereinafter contain, for the most part, elements of a certain nature. They can therefore not only be used to better understand the present invention, but also to contribute to the definition thereof, where applicable.

Figure 1:
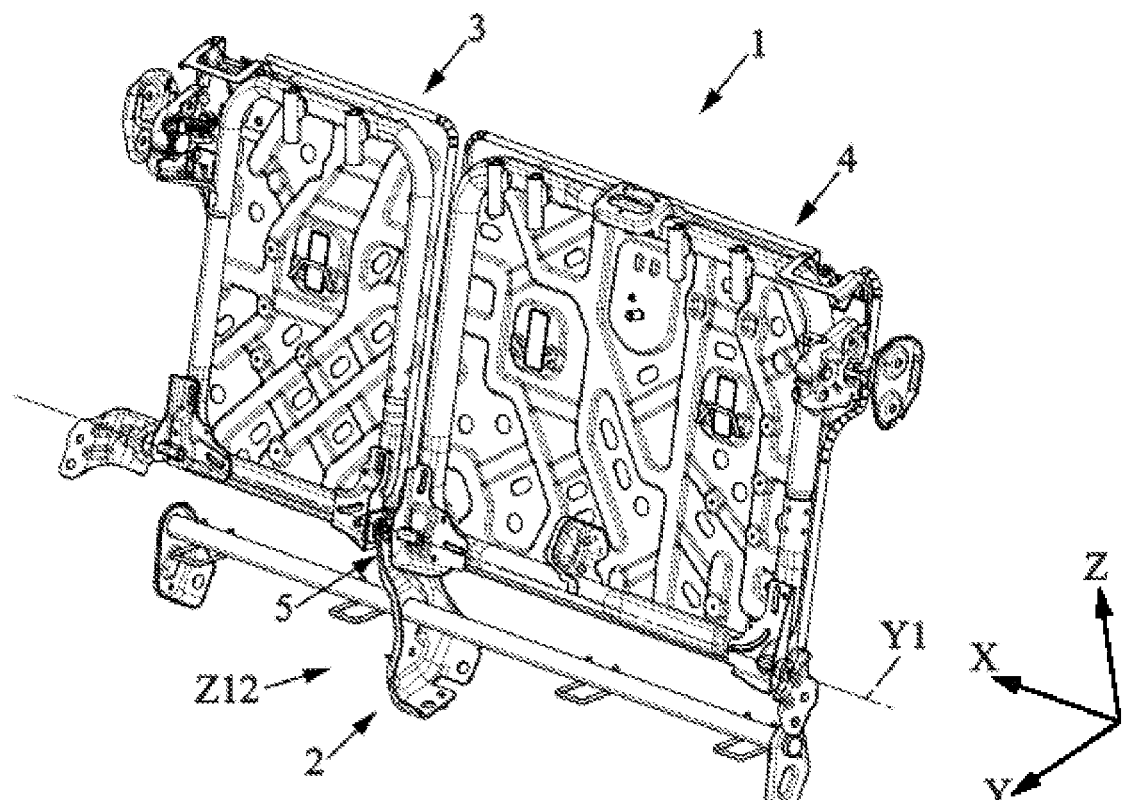
FIG. 1 shows a perspective view of a vehicle seat according to an embodiment in accordance with the invention.

In the whole of the present application, the directions in space are defined as follows:
- the longitudinal direction X of the seat corresponds to the direction of sliding of the seat relative to the floor of the vehicle along sliders, when the seat includes sliders as connection means to the floor of the vehicle, received on the lower frame of the seat, as shown in the embodiments of the figures,
- the vertical direction Z of the seat corresponds to the direction perpendicular to the plane of floor of the vehicle to which the seat is fastened, also perpendicular to the longitudinal direction of the seat defined hereinabove, as shown in the embodiments of the figures,
- the transversal direction Y of the seat is the direction perpendicular to the longitudinal direction and to the vertical direction, as shown in the embodiments of FIG. 1.

An axis is defined as a straight line according to a determined direction and, optionally with a determined sense. For example, a longitudinal axis is an axis according to said longitudinal direction.

For a revolving part, an axial direction is defined as a direction parallel to its axis of revolution and a radial direction is a direction that cuts the axis of revolution and is perpendicular to the latter.

Finally, in the whole of the present application, substantially longitudinal, transversal, vertical, axial or radial means an orientation relative to the longitudinal direction, the transversal direction, the vertical direction, an axial direction or a radial direction, with an angle less than 30°, which can advantageously be zero.

Likewise, substantially parallel means an orientation relative to a given element with an angle less than 30°, which can advantageously be zero.

The invention relates, as can be seen in the embodiment of FIG. 1, to a vehicle seat 1 configured so as to accommodate at least two users, comprising:
- a seating portion frame 2, intended to be connected to the floor of a vehicle,
- a first backrest 3 which is pivotally hinged to the seating portion frame 2 according to the transverse axis Y1 of the seat 1,
- a second backrest 4 which is pivotally hinged to the seating portion frame 2 according to the axis transversal Y1 of the seat 1.

According to the invention, the first backrest 3 and the second backrest 4 are connected to the seating portion frame 2 via a common hinge 5, positioned in an intermediate zone Z12 of the seating portion frame 2, in the transversal direction Y of the seat 1.

According to the invention, said common hinge 5 includes:
- a pivot pin 51 of an axis A51 coincident with the transverse axis Y1 of the seat 1, comprising at least one central portion 51C having an outer peripheral wall P51C, and two lateral portions: a first lateral portion 51L and a second lateral portion 51L', the two lateral portions 51L, 51L' being positioned on either side of the central portion 51C according to the axis A51 of the pivot pin 51,
- a first housing 52 arranged on the first backrest 3 and receiving interiorly the first lateral portion 51L of the pivot pin 5, by authorizing the rotation of the first backrest 3 relative to the pivot pin 51 about the axis A51 of said pivot pin 51,
- a second housing 53 arranged on the second backrest 4 and receiving interiorly the second lateral portion 51L' of the pivot pin 51, by authorizing the rotation of the second backrest 4 relative to the pivot pin 51 about the axis A51 of said pivot pin 51,
- a third housing 54, having an inner peripheral wall P54, arranged on the seating portion frame 2, and receiving interiorly the central portion 51C of the pivot pin 51, by immobilizing the pivot pin 51 relative to the seating portion frame 2, the inner peripheral wall P54 of the third housing 54 bearing, at least partially, against the outer peripheral wall P51C of the central portion 51C of the pivot pin 51.

According to the invention, the outer peripheral wall P51C of the central portion 51C of the pivot pin 51 includes at least one rib 55 configured to be elastically deformed according to a substantially radial direction of the pivot pin 51, so as to be maintained constantly bearing against the inner peripheral wall P54 of the third housing 54.

Thus, thanks to this advantageous design of the common hinge 5 between the first backrest 3 and the seating portion frame 2, and between the second backrest 4 and the seating portion frame 2, the contact between the outer peripheral wall P51C of the central portion 51C of the pivot pin 51 and the inner peripheral wall P54 of the third housing 54, is provided constantly, after manufacturing and during use of the seat 1 according to the invention, at least at the rib 55, thanks to its elasticity in an radial direction of the pivot pin 51, constantly constraining it towards the inner peripheral wall P54 of the third housing 54, and as can be seen in the embodiment of FIG. 4.

Thus, during the use of the seat 1 according to the invention, no clearance persists between the rib 55 and the inner peripheral wall P54 of the third housing 54, and the pivot pin 51 remains completely immobile relative to the third housing 54, thanks to the friction between said rib 55, and the inner peripheral wall P54 of the third housing 54, and optionally between the rest of the outer peripheral wall P51C of the central portion 51C of the pivot pin 51 and the inner peripheral wall P54 of the third housing 54.

Thus, the outer peripheral wall P51C of the central portion 51C of the pivot pin 51 does not risk striking the inner peripheral wall P54 of the third housing 54, and generating noise in the seat 1 during the use thereof, or deteriorating said common hinge 5.

According to an embodiment, the inner peripheral wall P54 of the third housing 54 has at least one groove 56, protruding in a radial direction from the third housing 54 opposite the axis A54 of the third housing 54, and receiving as support the rib 55 of the outer peripheral wall 51C of the central portion 51C of the pivot pin 51.

Figure 4A:
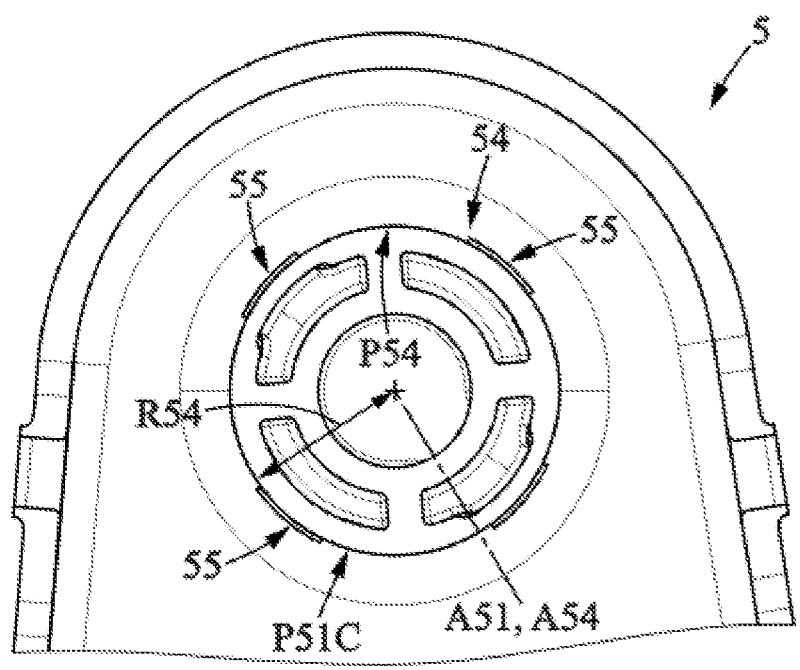
FIG. 4A shows a right view of the detail of the assembly between the third housing and the pivot pin of the seat of FIG. 1.
Figure 4B:
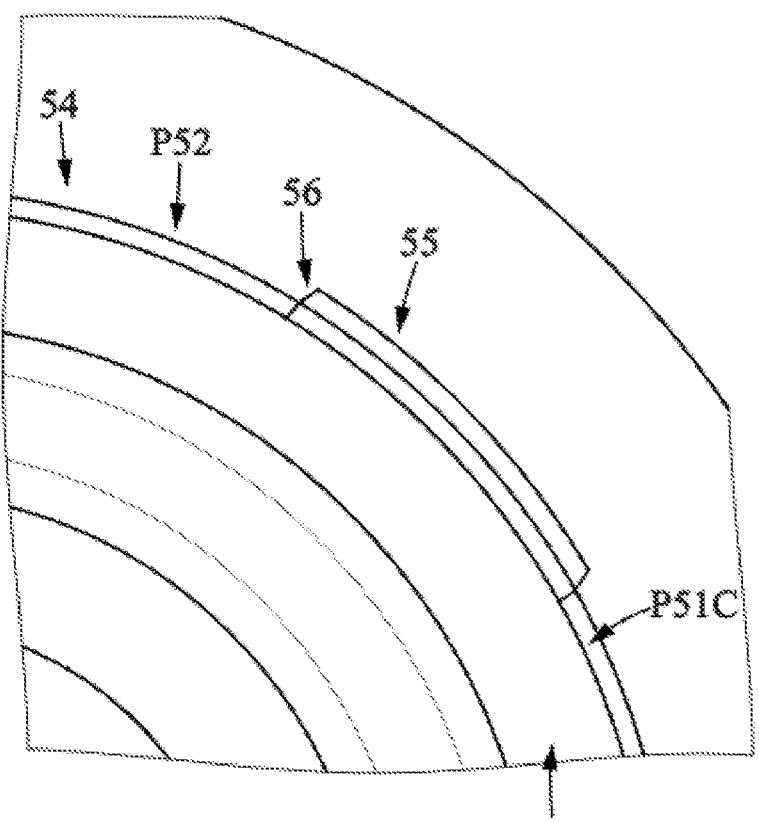
FIG. 4B shows an enlarged detail view of FIG. 4A.

As can be seen in the embodiment of FIGS. 4A and 4B, the groove 56 can advantageously be configured so as to simultaneously ensure the stoppage in translation of the rib 55 in a radial direction of the pivot pin 51, by constituting a stop against which the rib 55 abuts, as well as the stopping in rotation of the pivot pin 51 relative to the third housing 54 about the transverse axis Y1, by constituting two stops against which said rib 55 abuts.

Such a groove 56 thus makes it possible to provide an immobilization of the pivot pin 51 relative to the third housing 54 by elements abutting against one another, i.e. the rib 55 and the groove 56, and not only by friction between the inner peripheral wall P54 of the third housing 54 and the outer peripheral wall P51C of the central portion 51C of the pivot pin 51, which improves the resistance of the fastening between the third housing 54 and the pivot pin 51, and prevents a residual mobility between these elements during the use of the seat 1.

As can be seen in the embodiment of FIG. 4B, the shape and the dimensions of the groove 56 and of the rib 55 can advantageously be complementary, so that the rib 55 is fully received in the groove 56.

Advantageously, the dimensions of the groove 56, and in particular in a radial direction of the third housing 54, can be such that, when the rib 55 is received as bearing in said groove 56, the rib 55 is elastically constrained relative to its rest position, so as to provide a constant support between the rib 55 and said groove 56.

Figure 3:
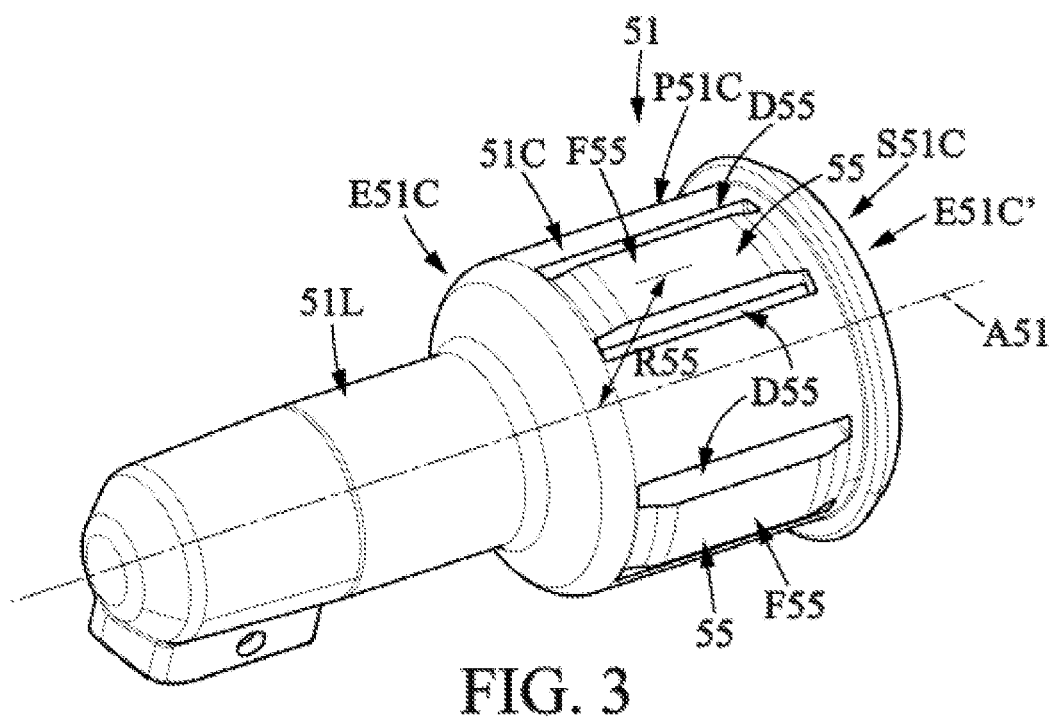
FIG. 3 shows a perspective view of the pivot pin of the seat of FIG. 1.

According to an embodiment, as can be seen in the embodiment of FIG. 3, the rib 55 extends in the axial direction A51 of the pivot pin 51.

This advantageous arrangement of the invention makes it possible to distribute the bearing force between the rib 55 and the inner peripheral wall P54 of the third housing 54 according to the axial direction A51 of the pivot pin 51, and therefore according to the axial direction of its central portion 51C, and therefore to improve the fastening between said pivot pin 51 and the third housing 54.

According to an embodiment, the rib 55 has a bearing face F55 bearing against the inner peripheral wall P54 of the third housing 54, advantageously against a corresponding bearing face F56 of the groove 56.

The rib 55 can then be configured so that, at rest, when the central portion 51C of the pivot pin 51 is not received in the third housing 54, the distance R55 separating the bearing face F55 of the rib 55 from the axis A51 of the pivot pin 51 is strictly greater than the radius R54 of the third housing 54.

This advantageous arrangement of the invention thus allows the rib 55 to be constantly maintained during the use of the seat 1 according to the invention against the inner peripheral wall P54 of the third housing 54, as can be seen in the embodiment of FIGS. 4A and 4B, with a bearing force that is sufficient to provide the immobilization of the pivot pin 51 relative to the third housing 54.

Advantageously, and in particular when said rib 55 is received in the groove 56 described hereinabove, the rest of the outer peripheral wall P51C of the central portion 51C of the pivot pin 51 can remain separated from the inner peripheral wall P54 of the third housing 54, during the use of the seat 1 according to the invention, which simplifies the manufacturing of this central portion 51C, in that the dimensional tolerances for the manufacturing thereof can be increased.

Also this makes it possible to reduce the risks of impact between said outer peripheral wall P51C of the central portion 51C of the pivot pin 51 and the inner peripheral wall P54 of the third housing 54 during the use of the seat 1 according to the invention, which could generate noise.

According to an embodiment, the rib 55 is arranged as a single piece and from the same material with the central portion 51C of the pivot pin 51.

This advantageous arrangement of the invention facilitates the manufacturing of the central portion 51C of the pivot pin 51, and therefore of the pivot pin 51.

The central portion 51C can for example be carried out by moulding.

Figure 2A:
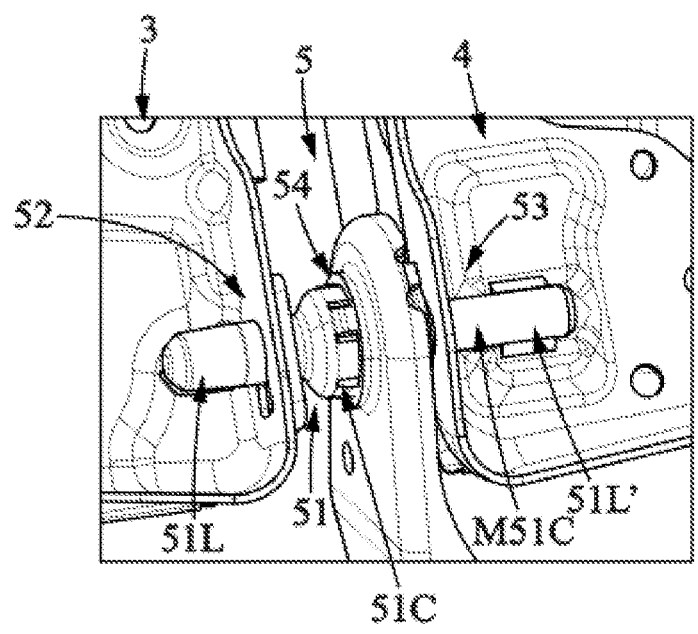
FIG. 2A shows a detailed view in perspective of the seat of FIG. 1.
Figure 2B:
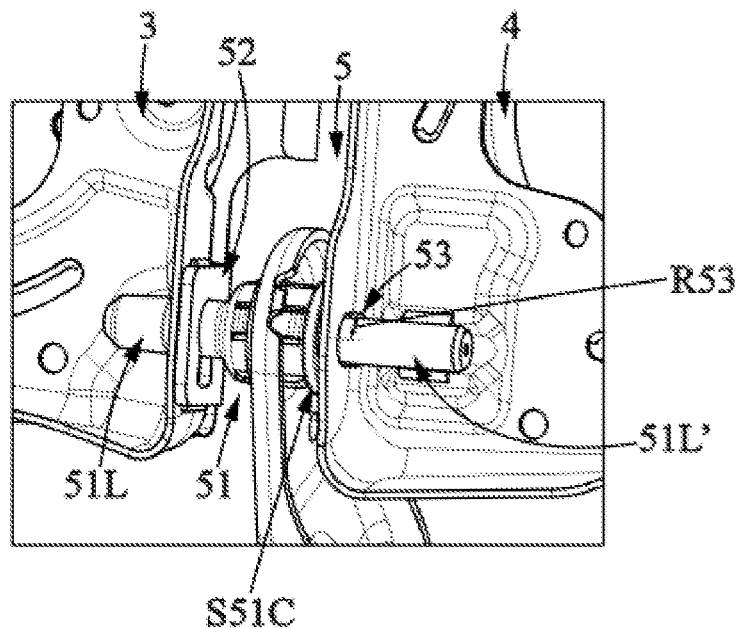
FIG. 2B shows a detailed view in perspective of the seat of FIG. 1.

According to an embodiment, and as can be seen more particularly in the embodiments of FIGS. 2A and 2B, the central portion 51C includes a core made of metal material M51C, and the outer peripheral wall P51C of the central portion 51C of the pivot pin 51 is made of plastic material, and covers the core made of metal material M51C.

This advantageous arrangement of the invention makes it possible to guarantee sufficient rigidity and resistance at the central portion 51C of the pivot pin 51, while still allowing the rib 55 to have the desired elasticity.

The plastic material of the outer peripheral wall P51C can for example be a resin, possibly reinforced with fibres, for example with glass fibre. The metal material of the metal core M51C can for example be steel.

As can be seen in the example of FIG. 2A or 2B, the first lateral portion 51L and/or the second lateral portion 51L', can also have a metal core covered with plastic material. The metal core of the first lateral portion 51L and/or of the second lateral portion 51L' can be common to the metal core M51C of the central portion 51C, and so as to simplifier the manufacturing of the pivot pin 51. Likewise, the outer peripheral wall P51C made of plastic can be common to the central portion 51C and to the first lateral portion 51L and/or to the second lateral portion 51L'.

Alternatively, as can be seen in the example of FIG. 2A or 2B, the first lateral portion 51L and/or the second lateral portion 51L', can have only a metal core not covered with plastic material. The metal core of the first lateral portion 51L and/or of the second lateral portion 51L' can be common to the metal core M51C of the central portion 51C, and so as to simplify the manufacturing of the pivot pin 51.

According to an embodiment, the outer peripheral wall P51C of the central portion 51C of the pivot pin 51 is carried out by overmoulding on the core made of metal material M51C.

This advantageous arrangement of the invention facilitates the carrying out of the central portion 51C of the pivot pin 51, and therefore of the pivot pin 51.

The central portion 51C can be formed from a mould whereon at least one removable drawer is provided so as to form the rib 55, and allow for easy demoulding of said central portion 51C.

Figure 5:
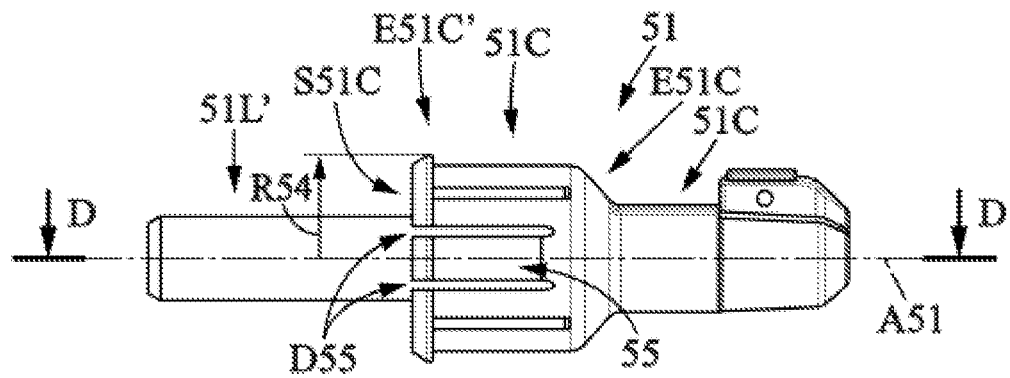
FIG. 5 shows a front view of the pivot pin of a vehicle seat according to an embodiment in accordance with the invention.

According to an embodiment, as can be seen in the embodiment of FIG. 3 or 5, the rib 55 is formed by a portion of the outer peripheral wall P51C of the central portion 51C of the pivot pin 51 delimited by two grooves D55, substantially identical and symmetrical with one another, arranged in the outer peripheral wall P51C the grooves D55 passing on both sides of the material of the outer peripheral wall P51C, in a radial direction of the pivot pin 51.

Alternatively, one or each one of the grooves D55 could not pass on both sides of the material of the outer peripheral wall P51C.

As can be seen in the embodiment of FIG. 3, the grooves D55 can advantageously delimit the bearing face F55 of the rib 55.

According to an embodiment, the grooves D55 extend according to a substantially axial direction of the pivot pin 51.

According to an embodiment, as can be seen in the embodiment of FIG. 5, the outer peripheral wall P51C has two axial ends E51C, E51C': a first axial end E51C in the vicinity of the first lateral portion 51L and a second axial end E51C' in the vicinity of the second lateral portion 51L', and wherein the grooves D55 are provided as emerging on the second axial end E51C' of the outer peripheral wall (P51C).

This advantageous arrangement of the invention makes it possible to increase the flexibility of the rib 55, and therefore to facilitate the insertion of the central portion 51C of the pivot pin 51 in the third housing 54.

Thanks to its elasticity said rib 55 can then pivot relative to the rest of the outer peripheral wall P51C about an axis substantially tangent to said outer peripheral wall P51C, and substantially perpendicular to a radial direction and to the axial direction A51 of the pivot pin 51.

Alternatively, and as can be seen in the embodiment of FIG. 3, the grooves D55 can be non-emerging, and so as to improve their resistance to rupture.

Figure 6:
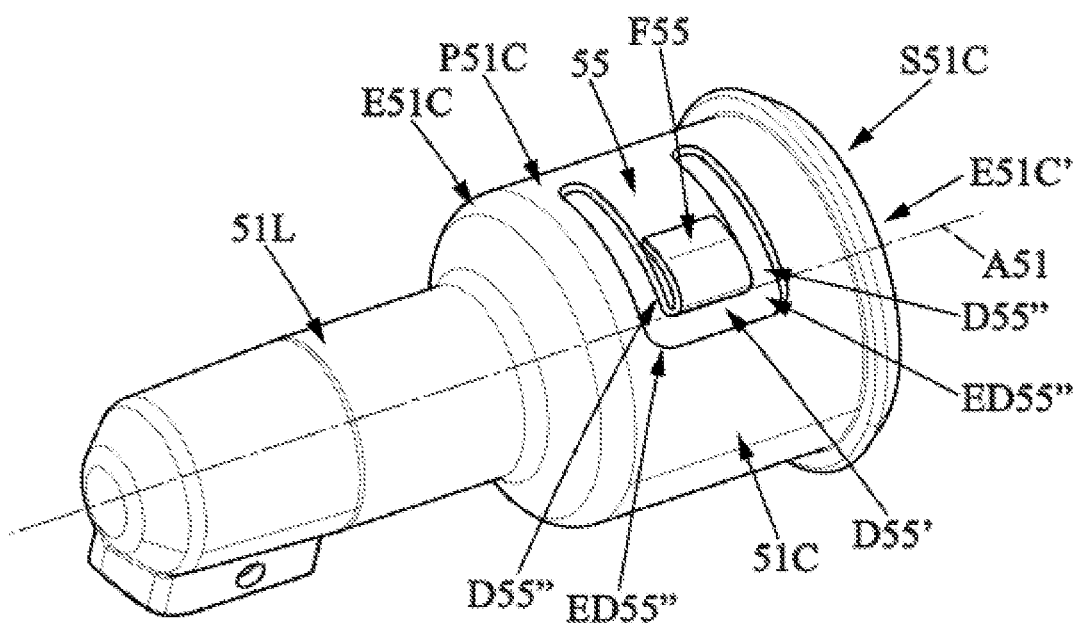
FIG. 6 shows a front view of the pivot pin of a vehicle seat according to an embodiment in accordance with the invention.

According to an embodiment, as can be seen in the embodiment of FIG. 6, the rib 55 is formed by a portion of the outer peripheral wall P51C of the central portion 51C of the pivot pin 5 delimited by a first groove D55' arranged in the outer peripheral wall P51C, extending in a substantially axial direction of the outer peripheral wall P51C and by at least one second groove D55", arranged in the outer peripheral wall P51C, and emerging at one of its longitudinal ends ED55" in the first groove D55', the first and the second groove D55', D55" passing on both sides of the material of the outer peripheral wall P51C, in a radial direction of the outer peripheral wall P51C.

Alternatively, one or each one of the grooves D55', D55" could not pass on both sides of the material of the outer peripheral wall P51C.

This advantageous arrangement of the invention also makes it possible to increase the flexibility of said rib 55, the latter being able, thanks to its elasticity, to pivot relative to the rest of the outer peripheral wall P51C about an axis substantially tangent to said outer peripheral wall P51C, and substantially perpendicular to a radial direction of the pivot pin 51 but parallel to the axial direction A51 of the pivot pin 51.

According to an embodiment, as can be seen in the embodiments of FIGS. 3, 5 and 6, the outer peripheral wall P51C has two axial ends E51C, E51C': a first axial end E51C in the vicinity of the first lateral portion 51L and a second axial end E51C' in the vicinity of the second lateral portion 51L', and an annular shoulder S51C is arranged on the outer peripheral wall P51C, at said second axial end E51C' of the outer peripheral wall P51C, protruding in a radial direction from the outer peripheral wall P51C opposite the axis A51 of the pivot pin 51 and having a radius RS51C strictly greater than the radius R53 of the second housing 53 arranged on the second backrest 4.

Advantageously, the annular shoulder S51C is arranged as a single piece and from the same material with said outer peripheral wall P51C of the central portion 51C of the pivot pin 51.

This annular shoulder S51C advantageously makes it possible to prevent the central portion 51C of the pivot pin 51 from being in the second housing 53, arranged on the second backrest 4, during the manufacturing of the seat 1 according to the invention.

Said annular shoulder S51C can extend over the entire perimeter of the outer peripheral wall P51C of the central portion 51C of the pivot pin 51, as can be seen in the embodiment of FIG. 3, or be interspersed with empty portions, as can be seen in the embodiments of FIGS. 5 and 6.

For example, the annular shoulder S51C can be provided to extend only in the extension of a rib 55, according to the axial direction A51 of the pivot pin 51.

The difference between the radius RS51C of the protrusion and the radius R53 of the second housing 53, at rest, can be comprised between 2 mm and 10 mm, preferably between 3 mm and 7 mm.

Advantageously, as can be seen in the embodiment of FIG. 4A, the radius RS51C of the annular shoulder S51C can also be strictly greater than the radius R54 of the third housing 54. Said annular shoulder S51C can thus also constitute an additional means of stopping in translation of the pivot pin 51 relative to the third housing 54 according to the axial direction A51 of the pivot pin 51, as a complement of the ribs 55, so as to prevent the removal of the central portion 51C of the pivot pin 51 of the third housing 54, for example during the manufacturing of the seat 1 according to the invention. According to an embodiment, the outer peripheral wall P51C of the central portion 51C of the pivot pin 51 includes a plurality of ribs 55 regularly distributed about the axis A51C of the pivot pin 51, in particular four.

This advantageous arrangement of the invention makes it possible to distribute the bearing force between the outer peripheral wall P51C of the central portion 51C of the pivot pin 51 and the inner peripheral wall P54 of the third housing 54 on the perimeter of the outer peripheral wall P51C and on that of the inner peripheral wall P54 of the third housing 54.

The ribs 55 can be identical or different, each one carried out according to one of the embodiments described hereinabove.

Regularly distributed about the axis A51C means that two successive ribs 55 are always separated by an identical angle about the axis A51C, for example 90° in the case where the outer peripheral wall P51C includes four ribs 55, as can be seen in the embodiment of FIG. 4A.

According to an embodiment, the first housing 52, the second housing 53 and the third housing 54 are coaxial, according to the transverse axis Y1 of the seat 1, and the first lateral portion 51L, the second lateral portion 51L' and the central portion 51C of the pivot pin 51 are coaxial, according to the transverse axis Y1 of the seat 1.

This advantageous arrangement of the invention makes it possible to facilitate the manufacturing of the pivot pin 51 of the seat 1 according to the invention.

The invention also relates to a vehicle bench comprising at least one vehicle seat 1 according to one of the embodiments described hereinabove.

The invention further relates to a vehicle comprising a bench according to one of the embodiments described hereinabove.

The vehicle can in particular be an automobile vehicle.

The invention finally relates to a method for manufacturing a vehicle seat 1 according to one of the embodiments described hereinabove, comprising the steps: insertion of the central portion 51C of the pivot pin 51 in the third housing 54 arranged on the seating portion frame 2, so that the at least one rib 55 of the central portion 51C bears against the inner peripheral wall P52 of the third housing 54; insertion of the first lateral portion 51L in the first housing 51 of the first backrest 3, insertion of the second lateral portion 51L' in the second housing 52 of the second backrest 4.

All of the arrangements described hereinabove relating to the manufacturing of the seat 1 according to the invention apply to the method according to the invention.

Thanks to the common hinge 5 of the seat 1 such as described hereinabove, such a method is particularly simple and rapid to implement and guarantees a resistant connection between the first backrest 3 and the seating portion frame 2 and between the second backrest 4 and the seating portion frame 2, and this common hinge 5 will not generate any noise during the course of use of the seat 1.

Naturally, other embodiments could have been considered by those skilled in the art without however leaving the scope of the invention defined by the claims hereinafter.

The invention claimed is:

1. A vehicle seat configured so as to accommodate at least two users, the vehicle seat comprising a transverse axis and a transversal direction, and comprising:
   a seating portion frame, intended to be connected to the floor of a vehicle, and comprising an intermediate portion,
   a first backrest which is pivotally hinged to the seating portion frame according to the transverse axis of the vehicle seat,
   a second backrest which is pivotally hinged to the seating portion frame according to the transverse axis of the vehicle seat,
   wherein the first backrest and the second backrest are connected to the seating portion frame via a common hinge, positioned in an intermediate zone of the seating portion frame, in the transversal direction of the vehicle seat, wherein said common hinge includes:
   a pivot pin of an axis coincident with the transverse axis of the vehicle seat, comprising at least one central portion having an outer peripheral wall, and two lateral portions: a first lateral portion a second lateral portion, the two lateral portions being positioned on either side of the central portion according to the axis of the pivot pin,
   a first housing arranged on the first backrest and receiving interiorly the first lateral portion of the pivot pin, by authorizing the rotation of the first backrest relative to the pivot pin about the axis of said pivot pin,
   a second housing arranged on the second backrest and receiving interiorly the second lateral portion of the pivot pin, by authorizing the rotation of the second backrest relative to the pivot pin about the axis of said pivot pin,
   a third housing, having an inner peripheral wall, arranged on the seating portion frame, and receiving interiorly the central portion of the pivot pin, by immobilizing the pivot pin relative to the seating portion frame, the inner peripheral wall of the third housing bearing, at least partially, against the outer peripheral wall of the central portion of the pivot pin,
   wherein the outer peripheral wall of the central portion of the pivot pin includes at least one rib configured to be elastically deformed according to a substantially radial direction of the pivot pin, so as to be constantly maintained bearing against the inner peripheral wall of the third housing.

2. The vehicle seat of claim 1, wherein the inner peripheral wall of the third housing has at least one groove, protruding in a radial direction from the inner peripheral wall opposite the axis of the inner peripheral wall, and receiving as support the rib of the outer peripheral wall of the central portion of the pivot pin.

3. The vehicle seat of claim 1, wherein the rib extends in the axial direction of the pivot pin.

4. The vehicle seat of claim 1, wherein the rib has a bearing face bearing against the inner peripheral wall of the third housing, and the rib is configured so that, at rest, when the central portion of the pivot pin is not received in the third housing, the distance separating the bearing face of the rib from the axis of the pivot pin is strictly greater than the radius of the third housing.

5. The vehicle seat of claim 1, wherein the rib is arranged as a single piece and from the same material with the central portion of the pivot pin.

6. The vehicle seat of claim 1, wherein the central portion includes a core made of metal material, and the outer peripheral wall of the central portion of the pivot pin is made of plastic material, and covers the core made of metal material.

7. The vehicle seat of claim 6, wherein the outer peripheral wall of the central portion of the pivot pin is carried out by overmoulding on the core made of metal material.

8. The vehicle seat of claim 4, wherein the rib is formed by a portion of the outer peripheral wall of the central portion of the pivot pin delimited by two grooves, substantially identical and symmetrical with one another, arranged in the outer peripheral wall the grooves passing on both sides the material of the outer peripheral wall, in a radial direction of the pivot pin.

9. The vehicle seat of claim 8, wherein the grooves extend according to a substantially axial direction of the pivot pin.

10. The vehicle seat of claim 8, wherein the outer peripheral wall has two axial ends: a first axial end in the vicinity of the first lateral portion and a second axial end in the vicinity of the second lateral portion, and wherein the grooves are provided as emerging on the second axial end of the outer peripheral wall.

11. The vehicle seat of claim 5, wherein the rib is formed by a portion of the outer peripheral wall of the central portion of the pivot pin delimited by a first groove arranged in the outer peripheral wall, extending in a substantially axial direction of the outer peripheral wall and by at least one second groove, arranged in the outer peripheral wall, and emerging at one of its longitudinal ends in the first groove, the first and the second groove passing on both sides the material of the outer peripheral wall, in a radial direction of the outer peripheral wall.

12. The vehicle seat of claim 1, the outer peripheral wall has two axial ends: a first axial end in the vicinity of the first lateral portion and a second axial end in the vicinity of the second lateral portion, and an annular shoulder is arranged on the outer peripheral wall, at said second axial end of the outer peripheral wall, protruding in a radial direction from the outer peripheral wall opposite the axis of the pivot pin and having a radius strictly greater than the radius of the second housing arranged on the second backrest.

13. The vehicle seat of claim 1 wherein the outer peripheral wall of the central portion of the pivot pin includes a plurality of ribs regularly distributed about the axis of the pivot pin, in particular four.

14. The vehicle seat of claim 1, wherein the first housing, the second housing and the third housing are coaxial, according to the transverse axis f the seat, and the first lateral portion, the second lateral portion and the central portion of the pivot pin are coaxial, according to the transverse axis of the seat.

15. A vehicle bench comprising at least one vehicle seat according to claim 1.

16. A vehicle comprising a bench according to claim 15.

17. A method for manufacturing a vehicle seat according to claim 1, comprising the steps of:
  inserting the central portion of the pivot pin in the third housing arranged on the seating portion frame, so that the at least one rib of the central portion bears against the inner peripheral wall of the third housing;
  inserting the first lateral portion into the first housing of the first backrest,
  inserting the second lateral portion into the second housing of the second backrest.

\* \* \* \* \*